United States Patent [19]

Wille

[11] Patent Number: 5,605,070

[45] Date of Patent: Feb. 25, 1997

[54] BLIND RIVET NUT SETTING DEVICE

[75] Inventor: Lothar Wille, Mörfelden-Walldorf, Germany

[73] Assignee: GESPIA Blindniettechnik GmbH, Franfurt am Main, Germany

[21] Appl. No.: 396,668

[22] Filed: Mar. 1, 1995

[30] Foreign Application Priority Data

Mar. 4, 1994 [DE] Germany .......................... 44 06 946.4

[51] Int. Cl.$^6$ .............................. B21J 15/26; B21D 9/05
[52] U.S. Cl. ........................... 72/391.4; 72/114; 72/391.8
[58] Field of Search .................................. 72/391.4, 114, 72/391.8; 29/243, 526

[56] References Cited

U.S. PATENT DOCUMENTS

| 2,437,191 | 3/1948 | Gill ........................................... 72/114 |
| 2,723,777 | 11/1955 | Amtsberg . | |
| 3,654,792 | 4/1972 | Mead ....................................... 72/391.8 |
| 3,838,588 | 10/1974 | Johnson . | |
| 4,070,889 | 1/1978 | DeCaro .................................... 72/114 |
| 4,574,612 | 3/1986 | Tanikawa ................................ 72/114 |
| 4,612,793 | 9/1986 | Klein ....................................... 72/391.8 |
| 4,821,555 | 4/1989 | Kamata et al. ........................ 72/391.8 |

FOREIGN PATENT DOCUMENTS

| 43216 | 1/1982 | European Pat. Off. .............. 72/391.8 |
| 0119007 | 9/1984 | European Pat. Off. . |
| 1449755 | 6/1965 | France . |
| 2274377 | 6/1965 | France . |
| 1945820 | 6/1966 | Germany . |
| 4215008 | 11/1993 | Germany . |
| 2098528 | 4/1982 | United Kingdom . |
| 2140727 | 5/1984 | United Kingdom . |
| WOA9322081 | 4/1993 | WIPO . |

Primary Examiner—David Jones
Attorney, Agent, or Firm—Darby & Darby

[57] ABSTRACT

A blind rivet nut setting device includes a drawing mandrel, a motor, an interruptible first drive line for producing a rotational motion of the drawing mandrel, and a second drive line for producing an axial motion of the drawing mandrel. The second drive line includes a drive element and an output element. The drive element is axially movable and a portion of its axial movement length corresponds to an idle stroke with respect to the output element and a second portion of its axial movement corresponds to an effective stroke of the output element. The final point of the path of axial movement of the drive element is predetermined so that the effective stroke finishes immediately at the final point. The length of the idle stroke is adjustable.

17 Claims, 3 Drawing Sheets

BLIND RIVET NUT SETTING DEVICE

BACKGROUND OF THE INVENTION

1. Field of the Invention

The present invention relates to a blind rivet nut setting device having a drawing mandrel, a motor, a first selectively interruptible drive line disposed between the motor and the drawing mandrel and a second drive line disposed between the motor and the drawing mandrel. The first drive line, when not interrupted, rotates the drawing mandrel. The second drive line has a drive element and an output element, which is connected to the drawing mandrel. The drive element is axially movable along a path which has an idle stroke portion and an effective stroke portion.

2. Discussion of the Related Art

Blind rivet nuts typically have a rivet shaft that has an internal thread and a set head. The rivet shaft is guided in a hole of a workpiece which is to be fastened to the blind rivet nut. While the set head is in contact with the material of the workpiece, an axial tension is applied to the rivet shaft by means of a drawing mandrel which is screwed into the internal thread of the rivet shaft. The tension causes a compression of the rivet shaft and a crowning of the rivet shaft material, which forms what is known in the art as a snap head. The blind rivet nut is now fastened to the material in the form of a blind rivet. Of course, several layers of material can be connected together with a blind rivet nut. After unscrewing the drawing mandrel, the thread in the workpiece remains intact and is available for other uses.

Because the drawing mandrel must at first be screwed into the blind rivet nut and then unscrewed after the setting, the work process for setting a blind rivet nut consists essentially of three steps: (1) Placing the blind rivet nut on the drawing mandrel; (2) Setting; and (3) Resetting. The placing of the nut on the mandrel must be finished before the setting step and requires a predetermined minimum amount of torque. If the blind rivet nut contacts the mouthpiece of the blind rivet nut setting device after the nut has been screwed in place, a premature compression of the rivet shaft may occur. The setting process must also be controlled fairly accurately. If the setting stroke or effective stroke is too small, the blind rivet nut will not be fastened to the workpiece with the required strength. If, however, the setting stroke is too large, the blind rivet nut could be damaged, thereby drastically reducing the reliability of the connection. Finally, the resetting process must take place so that the drawing mandrel can be unscrewed from the blind rivet nut with a predetermined amount of torque.

In EP 0 119 007 A2, a blind rivet nut setting device has a first drive line that includes a ratchet type coupling. When the ratchet coupling reaches a predetermined torque the coupling permits slippage in one direction. A drawing mandrel can be rotated and screwed into the blind rivet nut. After the blind rivet nut contacts the mouthpiece, the coupling will slip. The drawing mandrel can be unscrewed from the blind rivet nut by rotating the drawing mandrel with full torque in the reverse direction. A threaded spindle is connected to a motor. The threaded spindle has a slide which is axially displaced during a rotation of the threaded spindle. After an idle stroke, the slide contacts the stop of a spacer. This spacer then exerts tension on the drawing mandrel. The entire spacer is moved by the slide until the spacer reaches another stop. This other stop can be adjusted by insertion of additional spacers, which thereby determines the distance of the effective stroke.

Another blind rivet nut setting device is known from DE 19 45 820 U 1, which includes a drive motor that rotates in only one direction. A direction reversing drive is used to control the movement of the mandrel. When the blind rivet nut is set, the device must be compressed axially so that the necessary parts can come into engagement with each other. A slip coupling is provided in this device so that when the drawing mandrel has been threaded far enough onto the blind rivet nut, the coupling begins to slip. A torque limiting device is also provided which interrupts the drive of the drawing spindle when the power required for forming the snap head has reached a predetermined magnitude.

In both of these devices, it is relatively difficult to assure that the quality of the fastening of the blind rivet nut will remain consistent throughout the various sizes of blind rivet nuts that can be set with each device. In the '007 reference, a change of the spacer is required to vary the effective stroke. However, because this operation requires disassembling of the blind rivet nut setting device this operation can not be done in the field with the necessary care. In the '820 reference, one is dependent on the quality of the torque limiting device. However, it is known from experience, that the torque limit will change over time, e.g., through contamination. Therefore, the reliability of the connection of the blind rivet nut with the workpiece material will suffer.

SUMMARY OF THE INVENTION

An object of the present invention is to provide a blind rivet nut setting device which reliably sets blind rivet nuts.

In accordance with a preferred embodiment of the present invention, the object of the invention is achieved with a blind rivet nut setting device where the final position of the path of motion of an output element corresponds with the final position of the effective stroke and where the idle stroke of a drive element can be adjusted.

The effective stroke is a parameter, which, inter alia, is very important in providing a reliable connection between the blind rivet nut and the workpiece material. Of course, the effective stroke has to be selected in dependence upon the blind rivet nut and the material to be riveted. The correct setting of the effective stroke assures a correspondingly reliable connection. The total stroke of the drive element is subdivided into an idle stroke and an effective stroke. The effective stroke is formed at the end of the path of the drive element. The length of the effective stroke is preferably longer than the length of the idle stroke. The effective stroke, in accordance with the present invention, always finishes at the same location. Therefore, an operator can observe if a complete effective stroke has been carried out. The larger the effective stroke is, the smaller the idle stroke will be and vice versa. As long as the drive element is moving in the idle stroke, a portion of the drive energy of the motor can be used to rotate the drawing mandrel over a first drive line so that the blind rivet nut may be threaded onto the mandrel. The present invention permits an axial motion of the drive element and a simultaneous rotation of the drawing mandrel.

In a preferred embodiment of the present invention, a control device is provided which redirects the motor into the opposite direction as soon as the drive element has reached its end position. The control device could, for example, have a limit switch which acts as a switch for reversing the direction of the motor. Thus, the setting stroke of the blind rivet nut is controlled in a simple manner, which is especially advantageous if the motor is to be driven by a battery, including a rechargeable battery. When the charge of the battery is low, it is possible that the drawing mandrel may no longer completely carry out the required effective stroke (i.e., the setting stroke). Normally, an operator might not notice that the complete required effective stroke has not been carried out. The operator might believe that the stopping was caused by the completion of the effective stroke, while the stopping was really caused by a lack of charge in the battery. In accordance with the present invention, because the reversal of the drawing mandrel has not occurred, the operator will immediately know that the effective stroke has not been carried out. The operator can then remove the blind rivet nut and replace it with a new blind rivet nut or, if possible, the operator can fasten the blind rivet nut properly with a fresh setting process.

In a preferred embodiment, the first drive line has a direction dependent slip coupling that includes a coil spring. The coil spring coupling is seated on a driven element and transfers torque to the driven element through friction. When a load is applied in one direction, the coil spring will turn up and lift off from the part to be driven. The coil spring will thereafter slide over the driven element without driving it. If, however, a load is applied in the opposite direction, the coil spring will wrap around the driven part and transfer torque to the driven part with practically no loss. This type of coupling prevents, on the one hand, the blind rivet nut from being overloaded during the threading of the blind rivet nut onto the drawing mandrel, because when the rivet nut head comes into contact with the blind rivet nut setting device the coupling will begin to slip. On the other hand, the coupling makes it possible to unscrew the drawing mandrel from the blind rivet nut after the setting process has been complete without any problems, even if the unscrewing is more difficult to achieve because of the compression of the nut.

The first drive line has a selectively connectable coupling, which is particularly advantageous in saving energy. This selectively connectable coupling separates the motor from the rotation drive of the drawing mandrel without any friction losses, as is the case with a conventional slip or ratchet type coupling. The full torque of the motor can therefore be used to apply tension to the drawing mandrel. It is preferred to disconnect the coupling at a predetermined axial position of the drive element, which is in the range of the drive element's idle stroke. Thus, the rotation of the drawing mandrel will stop before the effective stroke takes place and therefore no friction losses are created by, for example, a slip coupling during the effective stroke. When the driving element begins to move (i.e., when the driving element is in the idle stroke range), the drawing mandrel can rotate without problems. Only at the end of the path of motion, i.e, when the selectively connectable coupling is disconnected and the effective stroke begins, is the motor used solely for applying tension to the drawing mandrel. The uncoupling of both the axial and rotational motion causes a lower use of power which is especially advantageous when the setting device is powered by batteries.

The selectively connectable coupling has two parts which can be moved axially with respect to each other. When the two parts are in the connected position, they can be rotated with respect to each other by more than 200°. When the two parts are to be reconnected, it is important that the one disconnectable part properly engages with the other fixed part. To accomplish this proper engagement, both parts are designed so that in the connected state they can rotate with respect to each other by more than 200°, and preferably by approximately 240°. By this design, the disconnected part is given some time during the connection process to move axially, with the amount of time corresponding to the amount of time it takes for the fixed part to rotate by more than 200°. During this time frame, the disconnected part can, as a rule, axially penetrate far enough into the fixed part to become properly engaged with the fixed part. However, once the two parts are connected, the amount of possible relative axial movement between the two connected parts is negligible and the two parts are therefore rotatably fixed with respect to each other in the connected position.

The drive element is axially connected to a rotation bar. The rotation bar is rotatably fixed with respect to the disconnectable part of the selectively connectable coupling. The rotation bar has an axial stop, which causes both the disconnectable part of the coupling and the rotation bar to move together axially with respect to the fixed part of the coupling.

The rotation bar connects the first drive line to the second drive line. In the first drive line, the rotation bar causes the rotation of the drawing mandrel. In the second drive line, the rotation bar is axially connected with the drive element so that the selectively connectable coupling can be selectively connected or disconnected depending upon the axial position of the drive element. The coupling is disconnected when the axial stop of the rotation bar exerts a predetermined minimum axial force on the disconnectable element of the coupling. When the coupling is being reconnected, the disconnectable element will remain fixed with respect to the rotation bar and both members will move in the opposite axial direction.

The rotation bar is rotatably fixed with respect to the output element so that the rotation of the rotation bar is transferred to the drawing mandrel. The output element is an element of both the first and the second drive lines.

The rotation bar passes through a portion of the second drive line. Thus, the space requirements of the blind rivet nut setting device are minimized. Additionally, the tension forces that are applied to the drawing mandrel can be distributed uniformly about the circumference of the drawing mandrel. Therefore, the drawing mandrel will not assume a slanted position which could disturb the reliability of the fastening of the blind rivet nut.

The output element is biased by a spring against a stop into a rest position. The axial position of the stop is adjustable, preferably from the outside. Thus, by adjusting the axial position of the stop, the idle stroke of the drive element can be adjusted.

The output element has an internal thread for receiving the drawing mandrel. The drawing mandrel and the output element each have external torque working surfaces which can be rotatably adjusted relative to each other. A slide is disposed radially about the output element. The slide can move axially with respect to the output element so that slide is disposed about both torque working surfaces. When various blind rivet nut sizes are to be used, a change of the drawing mandrel is often required. With the design according to the present invention, the drawing mandrels can be changed relatively easily and quickly. All that needs to be done is to move the slide axially to free up the drawing mandrel's torque working surface. Thereafter, the drawing mandrel can be unscrewed from the output element and another properly sized mandrel can be screwed in. When the proper drawing mandrel is inserted and has its torque working surface aligned with the torque working surface of the output element, the slide can be moved axially back to its original position. The drawing mandrel is now in the set position. The torque working surfaces can have, for example, an external hexagon shape, and the slide would be formed as a hollow cylinder having an internal hexagon shape. In a preferred embodiment, the axial position of the slide can be arrested in an axial direction so that mechanical loads, such as impact forces, will not cause a loosening of the drawing mandrel.

The second drive line has a spherical threaded drive. The housing of the threaded drive is rotatably driven by the motor and a threaded spindle disposed within the housing cannot rotate. Thus, axial motion of the spindle is produced immediately upon rotation of the housing. The threaded spindle has an axial hole to receive the rotation bar.

To operate the blind rivet nut setting device, the operator first activates a switch for the motor. A control device permits the motor to rotate for a predetermined number of rotations and then stops the rotation of the motor. This procedure permits the blind rivet nut to be threaded onto the drawing mandrel. The predetermined number of rotations is selected so that the drawing mandrel can be reliably threaded into the blind rivet nut. The number of rotations can be determined., depending on the blind rivet nut that is used. Alternatively, a fixed number of rotations can be predetermined to thread all nuts onto the drawing mandrel independent of their size. As a general rule, more rotations are provided than are necessary to screw the drawing mandrel completely into the blind rivet nut. This safety feature can be applied in the device of the present invention because after insertion of the blind rivet nut into the setting device, an additional rotation of the drawing mandrel is prevented by the slip coupling.

The idle stroke is preferably larger than the effective stroke. While this may cause more movement of the motor, the motion of the motor occurs with a negligible load applied against the motor so that amount of energy used is practically nil. Thus, before the drawing process begins, one can achieve the disconnecting of the selectively connectable coupling with a high degree of reliability regardless of the size of the blind rivet nut. The energy saved by this process is, as a rule, greater than the energy required by conventional blind rivet nut setting devices.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 5 is a plan view of a coupling; and

DETAILED DESCRIPTION OF THE PRESENT INVENTION

Figure 1:
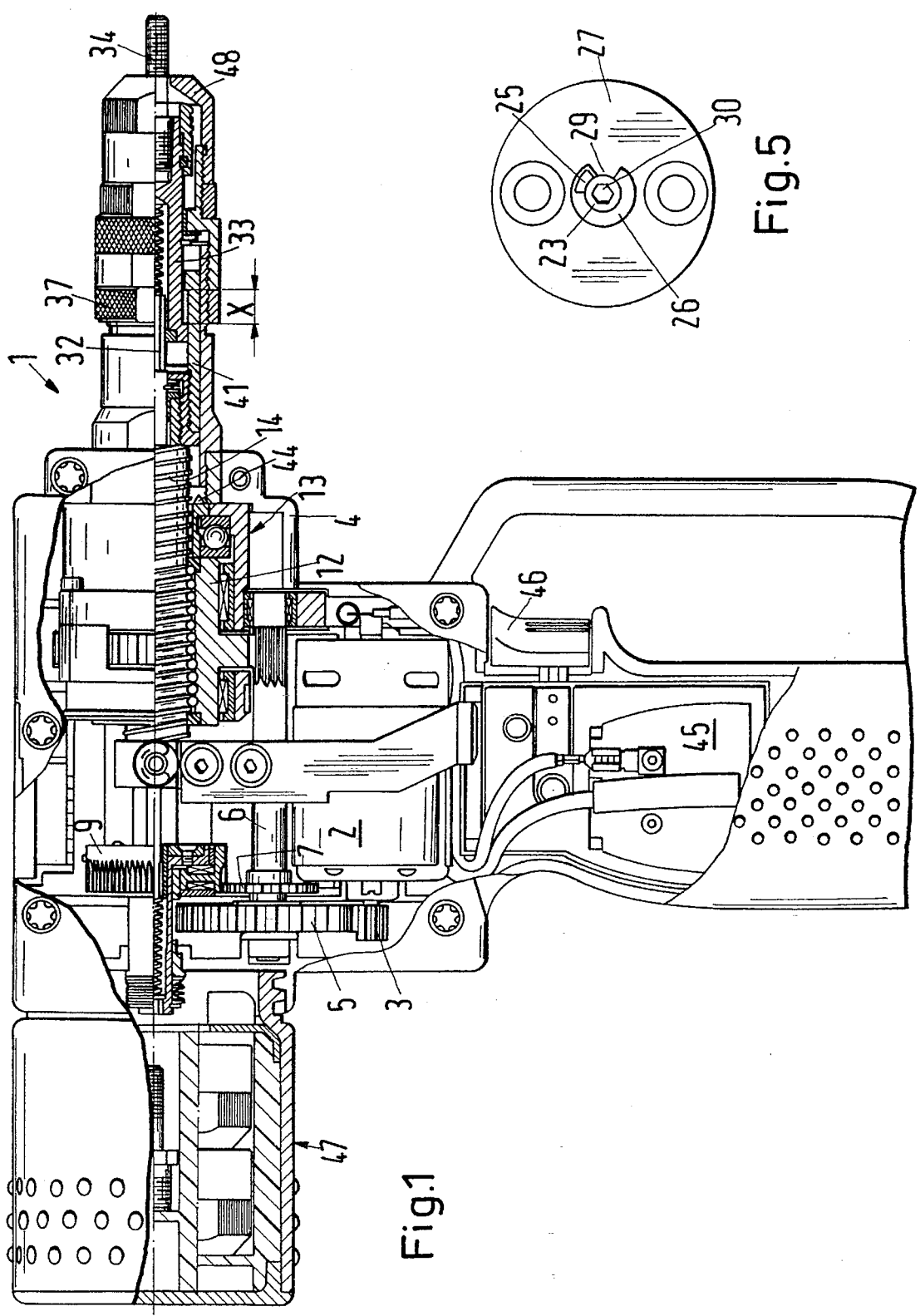
FIG. 1 is a side elevational view of a blind rivet nut setting device with parts broken away.

Referring now to FIG. 1, a blind rivet nut setting device 1 is illustrated. A motor 2 has a drive pinion 3 disposed at one axial end thereof. Motor 2 and drive pinion 3 are disposed in a housing 4. Drive pinion 3 is engaged with a transfer gear 5 that is keyed to a shaft 6. A second gear 7 is also keyed to shaft 6. A coupling housing 9 (see FIG. 2) has external teeth 8 that mate with second gear 7. Shaft 6 has gear teeth 10, which mate with external teeth 11 of a housing 12 (see FIGS. 1 and 3). A spherical threaded drive 13 has a threaded spindle 14, which cannot rotate, but due to the rotation of housing 12, can be moved axially inside of housing 4.

Figure 2:
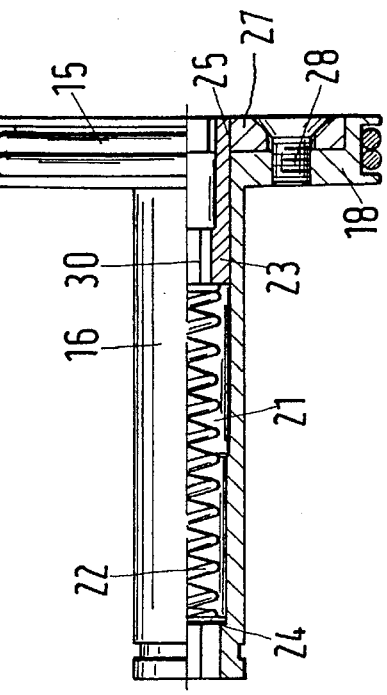
FIG. 2 is an enlarged side elevational view of components of FIG. 1, which form a first drive line, with the lower half broken away.
Figure 4:
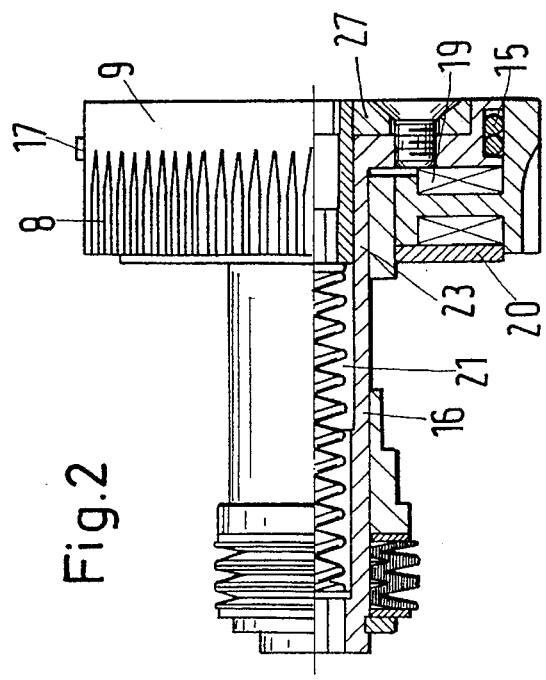
FIG. 4 is an enlarged side elevational view of components of a first drive line from FIG. 2, with the lower half broken away.
Figure 3:
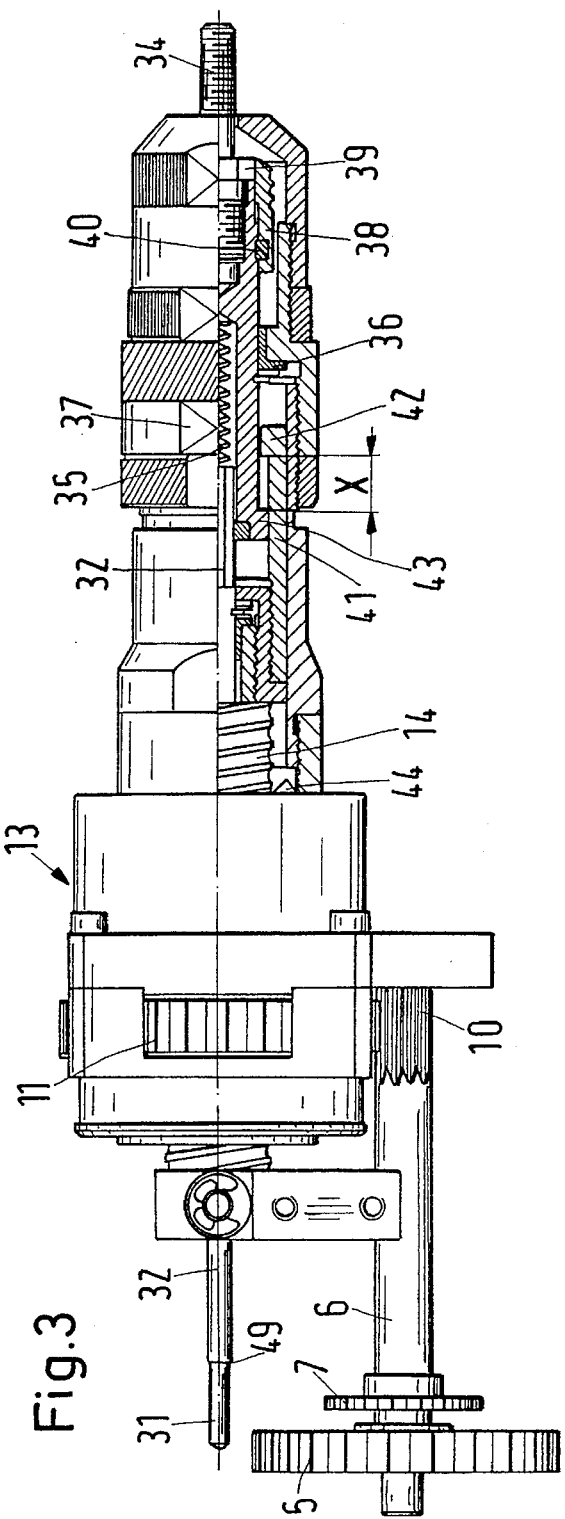
FIG. 3 is an enlarged side elevational view of components of FIG. 1, which form a second drive line, with parts broken away.
Figure 6:
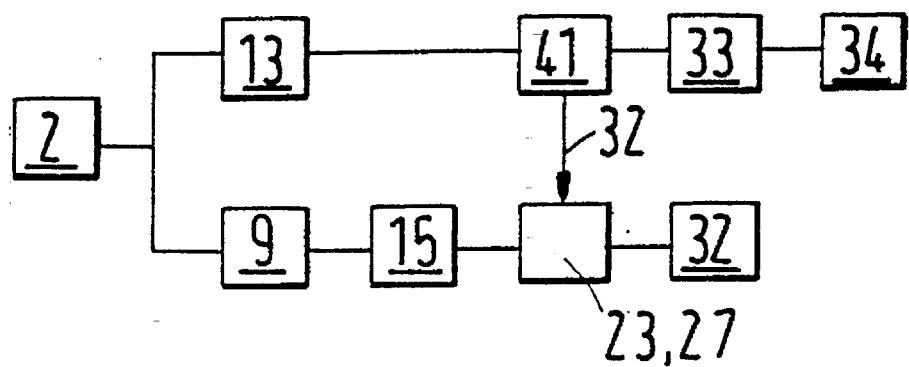
FIG. 6 is a schematic view showing both drive lines.

As illustrated in FIGS. 2 and 4, the coupling housing 9 rotatably drives shaft 16 through a coil spring 15. Coil spring 15 has a nose 17, which is fixedly inserted in housing 9. Coil spring 15 is wound around a drive flange 18 with a predetermined initial stress. When housing 9 is rotated in a clockwise manner, as viewed from the left axial end illustrated in FIG. 2, coil spring 15 causes shaft 16 to also rotate in the clockwise direction due to friction as long as a counter torque exerted on shaft 16 is not larger than the torque created by friction from spring 15. Should shaft 16 be restrained from rotational movement by a sufficiently large counter torque, coil spring 15 will widen so that it, together with drive flange 18, which is keyed to shaft 16, slips and transfers an essentially much smaller torque. If the housing 9 turns in the other direction, coil spring 15 tightens around the drive flange 18 and transfers the torque to shaft 16 essentially without any losses.

Shaft 16 is supported by an axial bearing 19. Disc 20 aids in maintaining the position of axial bearing 19 in housing 4. Shaft 16 is hollow and therefore has an internal space 21. A coil spring 22 is disposed within hollow space 21. Spring 22 is supported at one axial end by a disc 24 and engages a coupling element 23 at its opposite axial end. Coupling element 23 is biased by spring 22 in the axial direction. Coupling element 23 has a nose 25 which can be inserted into an opening 26 of a fixed coupling element 27 (see FIG. 5). Fixed coupling element 27 is connected, by screws 28, to drive flange 18 of shaft 16. In addition, fixed coupling element 27 is keyed to drive flange 18. As can be seen in FIG. 5, nose 25 does not completely occupy opening 26. Nose 25 can rotate by more than 200° inside of opening 26 and as is shown in the illustrated example, nose 25 can rotate by approximately 240°. As illustrated in FIG. 5, nose 25 bears against a projection 29 of the fixed coupling element 27 and is thus in the driven position. A rotation of the fixed coupling element 27 is then transferred to the coupling element 23 when nose 25 is disposed in hole 26. When coupling element 23 is moved axially so that its nose 25 is no longer in contact with projection 29 (i.e., to the left in FIGS. 2 and 4), a rotation of shaft 16 will no longer be transferred to the selectively connectable coupling element 23.

Coupling element 23 has an internal hexagon blind bore 30. When the coupling shown in FIG. 2 is in the position shown in FIG. 1, an external hexagon projection 31, disposed at the end of a rotation bar 32, will engage with the internal hexagon bore 30 of the coupling element 23. Both parts 32, 23 will therefore have a keyed connection with respect to each other. The rotation bar 32 can be axially moved over a predetermined distance within coupling element 23. Bar 32 can move to the left as viewed in FIG. 3, a projection or stop 49 created by the transition from the external hexagon 31 to a cylindrical circumference of the rotation bar 32 comes into contact with coupling element 23. Thereafter, any further motion of the rotation bar 32 to the left causes rotation bar 32 to be disconnected from coupling element 27.

Rotation bar 32 is, at its opposite axial end, keyed to the output drive element 33. Rotation bar 32 may, however, move axially with respect to output element 33. Output drive element 33 is in keyed engagement with a drawing mandrel 34. In the axial direction, a compression spring 35 is disposed between the rotation bar 32 and the output element 33. Spring 35 biases output element 33 against a stop 36. Stop 36 determines the rest position of the output element 33. The axial position of stop 36 can be adjusted from the outside by turning nut 37.

The drawing mandrel 34 is threaded into the output drive element 33. To prevent rotation of the threaded drawing mandrel 34 in the output element 33, an axially movable slide 38, having an internal hexagon shape, is disposed about the output element 33. Drawing mandrel 34 has in its axial center, between its fastening thread and its tension thread, an external hexagon shape 39, which matches with a corresponding external hexagon shape on the output element 33. If the slide 38 is moved to the right, it will contact the torque working surface of the external hexagon 39 so that the drawing mandrel 34 can no longer rotate in the output element 33. A stop ring 40 is provided between slide 38 and output element 33 so that slide 38 will remain in the preferred axial position. Accordingly, it is possible to change the drawing mandrel 34 to accommodate different size nuts in a relatively quick manner.

The coupling device shown in FIG. 2, together with the rotation bar 32 and the output element 33 forms a first drive line from motor 2. The first drive line causes a rotation of drawing mandrel 34.

A second drive line includes a spherical threaded drive 13 having a threaded spindle 14. Spindle 14 is axially fixed with respect to a drive element 41. Drive element 41 surrounds, at least for a portion of its axial length, output element 33. Drive element 41 has a radially inwardly directed projection 42. Projection 42 can, upon axial movement, contact an external shoulder 43 of drive element 33. However, before projection 42 contacts shoulder 43, drive element 41 must move axially by the length of an idle stroke, which is designated in the drawing as distance "X". As soon as projection 42 contacts shoulder 43, output element 33 will begin to move axially to the left, causing drawing mandrel 34 to be retracted into housing 4. In this manner, drawing mandrel 34 exerts tension on the blind rivet nut. Drive element 41 will, with every setting procedure, be brought into its end position where a limit switch 44 is activated.

Rotation bar 32 is axially fixed with respect to and is connected to the drive element 41. However, rotation bar 32 can rotate with respect to drive element 41. Accordingly, rotation bar 32 will follow the axial movement of drive element 41. If, for example, the drive element 41 and thus the rotation bar 32 moves to the left, as viewed in FIG. 3, stop 49 disposed on rotation bar 32 will eventually contact coupling element 23, which upon further leftward movement of rotation bar 32, will cause coupling element 23 to disengage from coupling element 27. This disconnection of the coupling is designed to occur before projection 42 comes in contact with shoulder 43 (i.e., during the idle stroke).

Motor 2 is connected to a control device 45, which is also connected to a limit switch 44 and an actuation switch 46. The operation of the setting device is described below as follows:

Depending on the blind rivet nut to be riveted, e.g. depending upon the blind rivet nut's diameter, length or material, a preferred drawing mandrel 34 is selected from a set of mandrels. Additional drawing mandrels, having corresponding mouth pieces, may be housed in a magazine 47 disposed at the opposite end of the blind rivet nut setting device 1. The idle stroke X between drive element 41 and the output element 33 can be adjusted by rotation of nut 37. Thus, the desired setting stroke is now set by the operator, and one is ready to set the blind rivet nut. The blind rivet nut is first inserted onto the drawing mandrel 34. Switch 46 is then actuated which causes control device 45 to send a signal to begin actuation of motor 2. Motor 2 rotates so that the drawing mandrel 34 rotates for a predetermined number of rotations so that the blind rivet nut is securely threaded onto the drawing mandrel 34. For safety reasons, several more rotations are provided than are actually needed to securely thread the blind rivet nut.

As soon as the blind rivet nut contacts the mouthpiece 48 of the setting device, further rotation of the drawing mandrel 34 is no longer possible because the nut will exert a relatively larger counter torque on the drawing mandrel 34. This counter torque is transferred to rotation bar 32 and also to shag 16, causing coil spring 15 to widen somewhat and to start slipping. The amount of counter torque required to start the slipping is a function of the pretension applied when coil spring 15 contacts drive flange 18. The limit torque must be large enough to permit the threading of the drawing mandrel 34 onto the nut, but also small enough to avoid damage to the nut due to a premature compression of the nut at the mouthpiece.

Drive element 41 begins moving to the left. Because rotation bar 32 is axially fixed with respect to drive element 41, rotation bar 32 also begins to move to the left and simultaneously also starts to rotate. Once the blind rivet nut is threaded onto the drawing mandrel, motor 2 will stop rotating. The operator can then insert the blind rivet nut into a prefinished hole of the workpiece. The operator now once again depresses switch 46. In response to the actuation of switch 46, control device 45 sends a signal to motor 2 which causes motor 2 to start rotating. Drive element 41, via the spherical thread drive 13, will move further to the left together with rotation bar 32. Before projection 42 of drive element 41 comes into contact with shoulder 43 of drive element 33, stop 49 on rotation bar 32 will cause the connection between the coupling element 23 and fixed coupling element 27 to disconnect. Accordingly, the rotation of drawing mandrel 34 will be interrupted, and all of the power of motor 2 can now be used to pull the drawing mandrel 34 because the friction between drive flange 18 and coil spring 15 will no longer draw power from motor 2.

Motor 2 will continue to rotate long enough in one direction that drive element 41, or another member that is connected securely to drive element 41, actuates limit switch 44. Once limit switch 44 is actuated, control device 45 will send another signal to motor 2, which will cause motor 2 to rotate in the opposite direction to move drive element 41 in the opposite direction. In addition, rotation bar 32 and spring 35 will also begin to move drive element 41 to the right causing the blind rivet nut to be pushed off of mouth piece 48. The reverse stroke of drive element 41 corresponds to the setting stroke. The reverse stroke is therefore relatively large but does not cause any significant reduction of power from motor 2. As soon as the reversal of the motor 2 is complete, the operator can immediately recognize if the setting of the blind rivet nut was successful (i.e., if the setting stroke had the required length) by observing if the reverse stroke has resulted in drawing mandrel 34 being returned to its initial position. This is particularly advantageous with the use of a setting device that uses portable energy sources, e.g., batteries. Because the end of the setting stroke requires the most power and the largest consumption of energy from the motor, it may occur that a battery with too small a charge will not have the power required to drive the motor to the end of the setting stroke. Therefore, if the motor was not redirected, this would be a sign to the operator that the end of the setting stroke was not reached.

The control device 45 may include a provision to permit the setting stroke to be interrupted by having the operator release switch 46. The early release of switch 46 will cause a signal to be sent to motor 2 to reverse the direction of the motor to cause drive element 41 to automatically be returned to its initial end position. When switch 46 is released, the movement of drawing mandrel 34 to the left is stopped and motor 2 continues to rotate until the drive element 41 reaches its front end position, which, as shown in FIG. 1, is all the way to the right. At a certain point in time, nose 25 of coupling element 23 will reach opening 26 of coupling element 27 and will also contact projection 29. Because projection 29 rotates, this rotation will be transferred to rotation bar 32, which causes a rotation of drawing mandrel 34. Drawing mandrel 34 will then unscrew from the blind rivet nut. Coil spring 15 will now be loaded in the opposite direction, which means that spring 15 will pull tightly around the drive flange 18, so that there is practically no loss of torque between coupling housing 9 and shaft 16. As soon as the drawing mandrel is unscrewed from the blind rivet nut, a new blind rivet nut can once again be set on drawing mandrel 34.

Having described the presently preferred exemplary embodiment of a new and improved blind rivet nut setting device, in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

I claim:

1. A blind rivet nut setting device comprising:
   a drawing mandrel;
   a motor;
   a first drive line being disposed between said motor and said drawing mandrel, said first drive line having means for selectively producing a rotational movement of said drawing mandrel;
   a second drive line being disposed between said motor and said drawing mandrel, said second drive line having means for producing an axial movement of said drawing mandrel, said second drive line including a drive element and an output element, said drive element being axially movable for a predetermined length that includes an idle stroke length and an effective stroke length where an end position of said axial movement of said drive element is predetermined, so that said effective stroke length ends immediately when said drive element reaches said end position, said idle stroke length being adjustable.

2. A device according to claim 1, further comprising a control device that controls a rotation of said motor so that said motor rotates in an opposite direction when said drive element reaches said end position.

3. A device according to claim 1, wherein said first drive line includes a rotational direction dependent slip coupling that includes a coil spring.

4. A device according to claim 3, wherein said first drive line includes a selectively connectable rotation coupling.

5. A device according to claim 4, wherein said selectively connectable rotation coupling disconnects at a predetermined axial position of said drive element, said predetermined axial position being within said idle stroke length of said drive element.

6. A device according to claim 4, wherein said selectively connectable rotation coupling includes a coupling element and a fixed coupling element that can move axially with respect to each other, and when said coupling element and said fixed coupling element are connected they may be rotated with respect to each other by more than 200°.

7. A device according to claim 5, wherein said selectively connectable rotation coupling includes a coupling element and a fixed coupling element that can move axially with respect to each other, and when said coupling element and said fixed coupling element are connected they may be rotated with respect to each other by more than 200°.

8. A device according to claim 7, wherein said drive element is axially fixed with respect to a rotation bar, said rotation bar being connected to said coupling element so that said rotation bar and said coupling element are rotationally fixed with respect to each other, said rotation bar has an axial stop disposed thereon to permit said fixed coupling element and said rotation bar to be moved axially with respect to each other.

9. A device according to claim 8, wherein said rotation bar is rotationally fixed with respect to said output element.

10. A device according to claim 8, wherein said rotation bar is at least partially disposed in a portion of said second drive line.

11. A device according to claim 2, further comprising a switch which when actuated causes said control device to send a signal to said motor and causes said motor to rotate for a predetermined number of rotations and then stop rotating.

12. A device according to claim 1, wherein said idle stroke length is larger than said effective stroke length.

13. A blind rivet nut setting device comprising:
   a drawing mandrel;
   a motor;
   a first drive line being disposed between said motor and said drawing mandrel, said first drive line having means for selectively producing a rotational movement of said drawing mandrel, said first drive line including a rotational direction dependent slip coupling that includes a coil spring, said first drive line including a selectively connectable rotation coupling;
   a second drive line being disposed between said motor and said drawing mandrel, said second drive line having means for producing an axial movement of said drawing mandrel, said second drive line including a drive element and an output element, said drive element being axially movable for a predetermined length that includes an idle stroke length and an effective stroke length where an end position of said axial movement of said drive element is predetermined, so that said effective stroke length ends immediately when said drive element reaches said end position, said idle stroke length being adjustable.

14. A blind rivet nut setting device comprising:
   a drawing mandrel;
   a motor;
   a first drive line being disposed between said motor and said drawing mandrel, said first drive line having means for selectively producing a rotational movement of said drawing mandrel;

a second drive line being disposed between said motor and said drawing mandrel, said second drive line having means for producing an axial movement of said drawing mandrel, said second drive line including a drive element and an output element, said drive element being axially movable for a predetermined length that includes an idle stroke length and an effective stroke length where an end position of said axial movement of said drive element is predetermined, so that said effective stroke length ends immediately when said drive element reaches said end position, said idle stroke length being adjustable, said output element moving axially for a distance corresponding to said effective stroke length, an initial position of said axial movement of said output element being defined by a stop, said output element being biased against said stop by a spring, an axial position of said stop being adjustable.

15. A device according to claim 14, wherein said output element has a threaded portion for receiving said drawing mandrel and said drawing mandrel and said output element each have a torque working surface that are rotatably adjustable with respect to each other, a slide being disposed about said output element and said drawing mandrel to permit the axial sliding of said slide on the torque working surfaces of said drawing mandrel and said output element.

16. A device according to claim 15, wherein said axial movement of said slide can be arrested by a stop ring disposed between said slide and said output element.

17. A blind rivet nut setting device comprising:

a drawing mandrel;

a motor;

a first drive line being disposed between said motor and said drawing mandrel, said first drive line having means for selectively producing a rotational movement of said drawing mandrel;

a second drive line being disposed between said motor and said drawing mandrel, said second drive line having means for producing an axial movement of said drawing mandrel, said second drive line including a drive element and an output element, said drive element being axially movable for a predetermined length that includes an idle stroke length and an effective stroke length where an end position of said axial movement of said drive element is predetermined, so that said effective stroke length ends immediately when said drive element reaches said end position, said idle stroke length being adjustable, said second drive line including a spherical threaded drive having a threaded spindle that moves axially and cannot rotate, said spherical threaded drive having a housing that is rotatably driven by said motor.

* * * * *